(12) United States Patent
Sakakura et al.

(10) Patent No.: US 11,217,957 B2
(45) Date of Patent: *Jan. 4, 2022

(54) RESIN MOLDED PRODUCT AND METHOD FOR PRODUCING SAME

(71) Applicant: Sumitomo Wiring Systems, Ltd., Mie (JP)

(72) Inventors: Kouji Sakakura, Mie (JP); Yutaka Kobayashi, Mie (JP)

(73) Assignee: Sumitomo Wiring Systems, Ltd., Yokkaichi (JP)

( * ) Notice: Subject to any disclaimer, the term of this patent is extended or adjusted under 35 U.S.C. 154(b) by 503 days.

This patent is subject to a terminal disclaimer.

(21) Appl. No.: 16/074,112

(22) PCT Filed: Feb. 7, 2017

(86) PCT No.: PCT/JP2017/004351
§ 371 (c)(1),
(2) Date: Jul. 31, 2018

(87) PCT Pub. No.: WO2017/150091
PCT Pub. Date: Sep. 8, 2017

(65) Prior Publication Data
US 2021/0104859 A1  Apr. 8, 2021

(30) Foreign Application Priority Data

Feb. 29, 2016  (JP) .............................. JP2016-036775

(51) Int. Cl.
| H01R 43/24 | (2006.01) |
| H01R 9/16 | (2006.01) |
| H01R 9/24 | (2006.01) |

(52) U.S. Cl.
CPC .............. *H01R 43/24* (2013.01); *H01R 9/16* (2013.01); *H01R 9/24* (2013.01)

(58) Field of Classification Search
CPC . H01R 43/24; H01R 9/24; H01R 9/16; H01R 13/405; B29C 45/14
(Continued)

(56) References Cited

U.S. PATENT DOCUMENTS

| 8,518,751 B2 * | 8/2013 | Sakamoto ........... H01L 21/4842 438/123 |
| 10,770,856 B2 * | 9/2020 | Eder ...................... H01R 13/02 |

(Continued)

FOREIGN PATENT DOCUMENTS

| JP | 2001-332371 | 11/2001 |
| JP | 2007-033164 | 2/2007 |

(Continued)

OTHER PUBLICATIONS

International Search Report dated May 16, 2017.

*Primary Examiner* — Travis S Chambers
(74) *Attorney, Agent, or Firm* — Gerald E. Hespos; Matthew T. Hespos; Michael J. Porco

(57) ABSTRACT

A resin molded product is a terminal body 10 in which plate-like terminals 20 and a housing 40 made of synthetic resin are integrally fixed and includes bent portions 22 provided substantially at a right angle by press-working the terminals 20, molded portions 62 provided in the housing 40 to embed and cover inner curved surfaces 30 of the bent portions 22 obliquely from a lower-rear side, flat surface portions 32 provided in the form of flat surfaces on inner peripheral edge parts of side parts 22A of the bent portion 22 and disposed adjacent to the molded portions to be exposed from the molded portions, and thinned portions 34 made thinner than the flat surface portions 32 on the side parts 22A.

2 Claims, 18 Drawing Sheets

(58) Field of Classification Search
USPC .......................................................... 439/606
See application file for complete search history.

(56) References Cited

U.S. PATENT DOCUMENTS

| | | |
|---|---|---|
| 10,916,867 B2* | 2/2021 | Sakakura .............. H01R 13/405 |
| 2012/0238143 A1* | 9/2012 | Matsuoka ............ H01R 13/504 |
| | | 439/626 |
| 2012/0329338 A1* | 12/2012 | Umemura .......... H01R 13/2421 |
| | | 439/733.1 |
| 2015/0044916 A1* | 2/2015 | Beck ...................... H01R 43/16 |
| | | 439/733.1 |
| 2015/0061105 A1 | 3/2015 | Oose |
| 2018/0036785 A1* | 2/2018 | Masai .................... B21D 28/26 |

FOREIGN PATENT DOCUMENTS

| | | |
|---|---|---|
| JP | 2012-195067 | 10/2012 |
| JP | 2014-232688 | 12/2014 |
| JP | 2015-53301 | 3/2015 |

* cited by examiner

RESIN MOLDED PRODUCT AND METHOD FOR PRODUCING SAME

BACKGROUND

Field of the Invention

This specification relates to a resin molded product and a method for producing the same.

Description of the Related Art

Japanese Unexamined Patent Publication No. 2012-195067 discloses a terminal block formed to fix an L-shaped conductive plate integrally to a connector housing made of synthetic resin.

In assembling this terminal block, the conductive plate initially is bent into an L shape by stamping and bending a metal plate material by press working. The conductive plate then is set in a mold and molding resin is poured into the mold to form a primary molded product. Secondary molding then is carried out using this primary molded product as a core to mold the connector housing.

If the conductive plate is made thicker in the above-described terminal block, excess metal bulges out on both widthwise sides of the bend when forming the bend. Thus, if it is attempted to mold the connector housing by cutting off the molding resin at the position of the bend, the excess metal parts of the bend interfere with the mold, and the conductive plate cannot be set in the mold.

A width of the bend could be made smaller to offset the formation of the excess metal parts at the bend. However, the width of the bend then is smaller than a predetermined width and the resin cannot be cut off at the position of the bend, thereby causing resin leakage.

A method for enabling a metal member such as a conductive plate to be set in a mold and preventing resin leakage to an unintended part is disclosed in this specification.

SUMMARY

This specification is directed to a resin molded product in which a metal plate and a resin portion made of synthetic resin are fixed integrally. The resin molded product includes a molded portion provided in the resin portion and configured to embed parts of sides of the metal member extending along a plate thickness direction. Flat surfaces are provided on edges of the sides and are disposed adjacent to the molded portion to be exposed from the molded portion, and thinned portions are disposed on sides opposite to the molded portion across the flat surfaces on the sides and are made thinner than the flat surfaces.

The invention also is directed to a method for producing a resin molded product in which a metal plate and a resin portion made of synthetic resin are fixed integrally. The method includes forming flat surfaces on edges of a press-worked portion formed by press-working a metal member and bringing a mold for forming the resin portion into contact with the flat surfaces to cut off molding resin, thereby restricting resin leakage at side parts of the press-worked portion.

For example, if the metal member is press-worked, there is a tendency that the resin portion cannot be set in a mold due to distortion of the sides of the metal member caused by press working. However, side surfaces of the metal member that are susceptible to distortion are worked to be flat so that the press-worked portion can be set properly in the mold.

Further, the mold can be brought into contact with the flat surfaces so that the molding resin can be cut off reliably and will not leak to unintended parts.

The flat surfaces may be provided on side parts of a bend provided by bending the metal member. An inner curved surface of the bend may be embedded in the molded portion, the flat surfaces may be provided on inner peripheral edges of the bend extending along a bending direction, and the thinned portions may be provided on outer peripheral edges of the bend extending along the bending direction. According to this configuration, the mold can be brought into contact with the flat surfaces provided on the inner peripheral edges on both sides of the bend, and cut off in forming the resin portion. Thus, it is possible to prevent the leakage of the resin for forming the molded portion from an inner surface of the bend to the thinned portions and an outer surface of the bend.

The metal member may be a conductor including a connecting portion in the form of a flat plate connectable to a mating conductor while being continuous with one end of the bend, and a body in the form of a flat plate provided to be continuous with the other end of the bend. The bend may be bent such that an angle between the connecting portion and the body is a right angle.

When the connecting portion is provided on the one end of the bend, the molding resin may adhere to a connection surface of the connecting portion and connection reliability between the mating conductor and the connecting portion may be reduced if resin leakage occurs at the bend. However, according to the above configuration, even if excess metal parts are formed on the side edges of the bend by bending substantially at a right angle, resin leakage at the bend can be prevented by forming the flat surfaces on the side edges of the bend and cutting off the resin between the flat surfaces and the mold. Thus, the adhesion of the molding resin to the connecting portion can be prevented. This is very effective when the bend is distorted by being bent by press working.

According to the teaching of this specification, resin leakage to an unintended part is prevented while it is enabled to set a metal plate material in a mold.

DETAILED DESCRIPTION

An embodiment is described with reference to FIGS. 1 to 18. A terminal block (an example of a "resin molded product") 10 to be mounted on an unillustrated case of a device installed in a vehicle is illustrated in this embodiment, and the terminal block 10 is for joining unillustrated device-side terminals disposed in the case and unillustrated mating terminals (an example of a "mating conductor") provided on an end of a wiring harness. Note that, in the following description, a lateral direction is based on a lateral direction in FIGS. 2 and 10 and a vertical direction is based on a vertical direction in FIGS. 2 and 10. Further, a front-rear direction is based on a lateral direction in FIGS. 5, 11 and 17, wherein a shown left side is referred to as a front side and a shown right side is referred to as a rear side.

As shown in FIGS. 1 to 7, the terminal block 10 includes three terminals (an example of a "metal member") 20, and a housing (an example of a "resin portion") 40 made of synthetic resin and integrally fixed to each of the three terminals 20 juxtaposed in the lateral direction.

Figure 8:
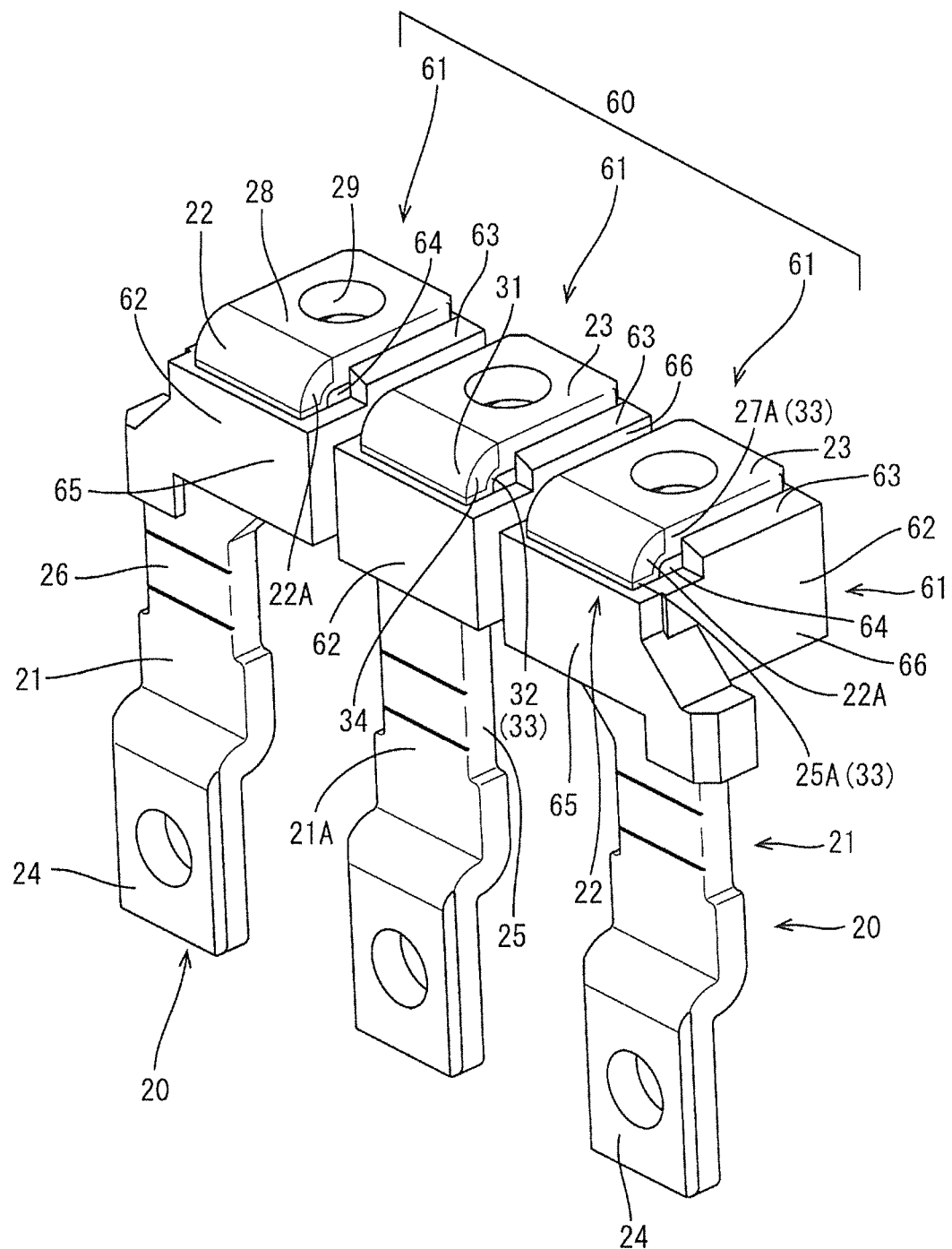
FIG. 8 is a perspective view of a primary molded product group.
Figure 9:
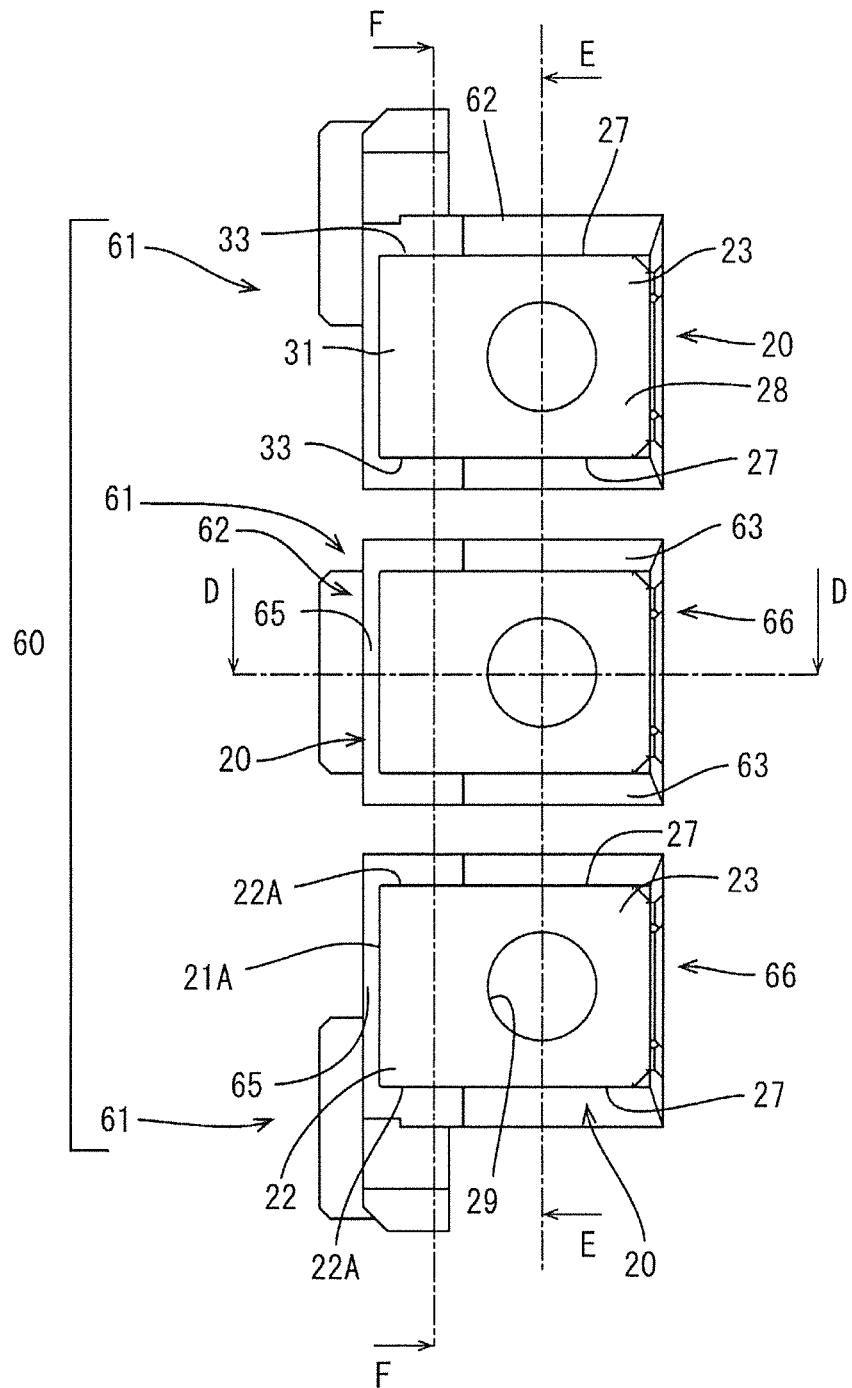
FIG. 9 is a plan view of the primary molded product group.
Figure 15:
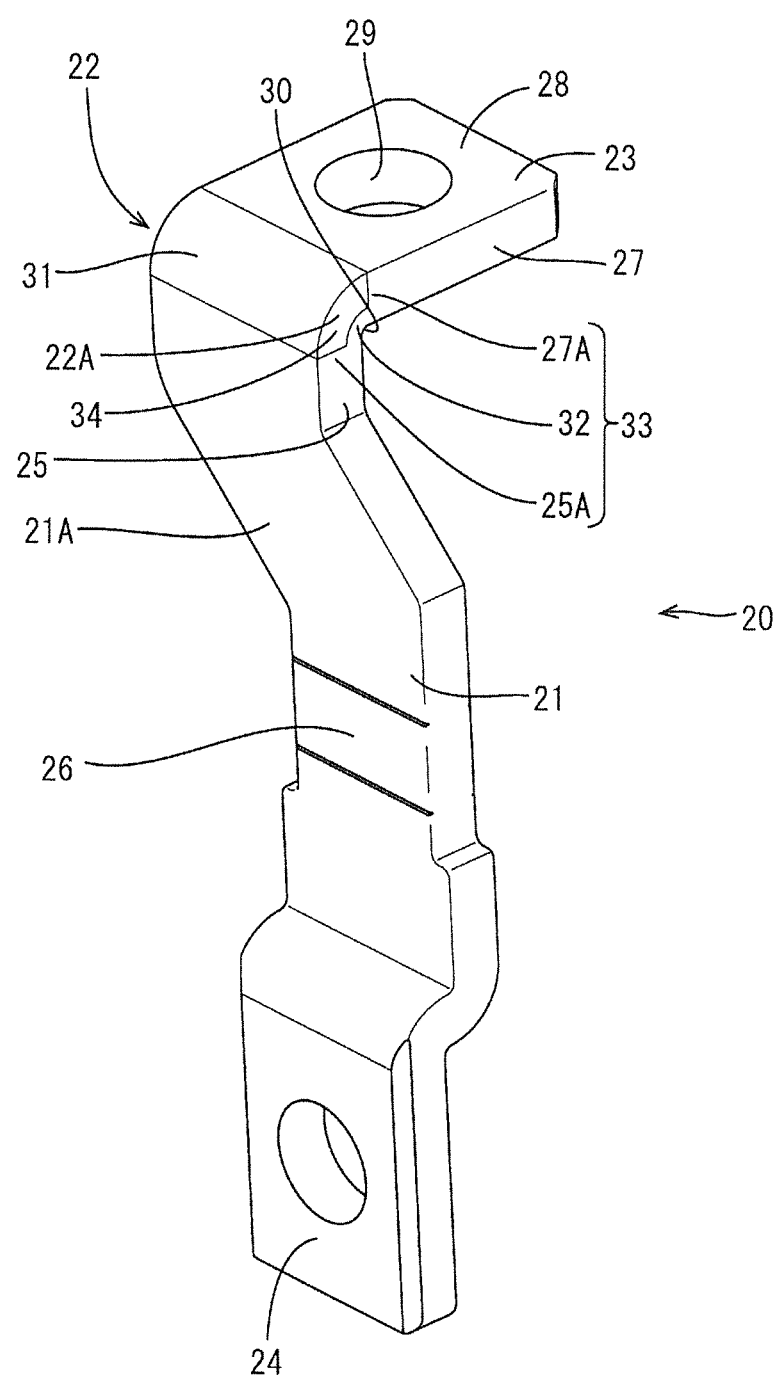
FIG. 15 is a perspective view of a terminal.
Figure 16:
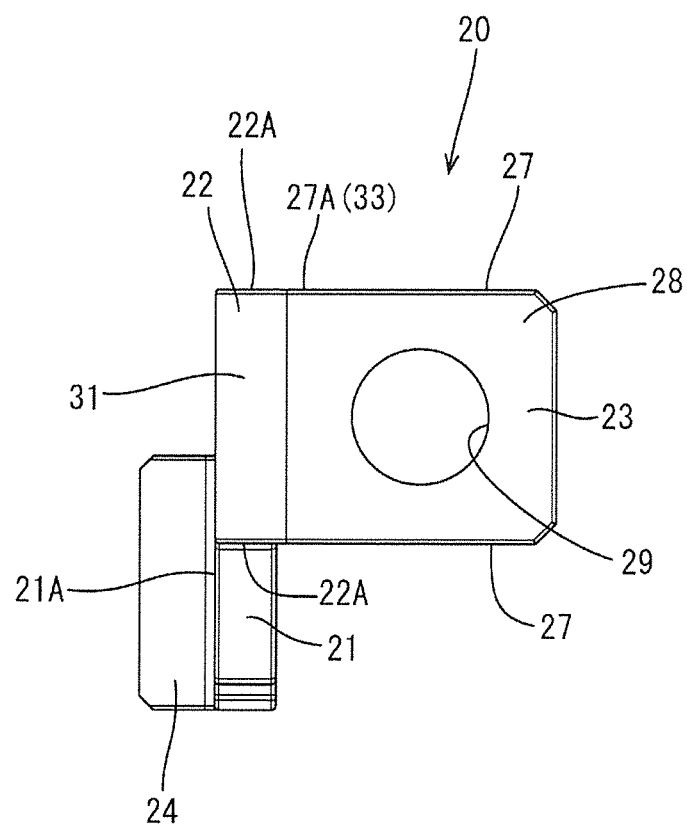
FIG. 16 is a plan view of the terminal.
Figure 17:
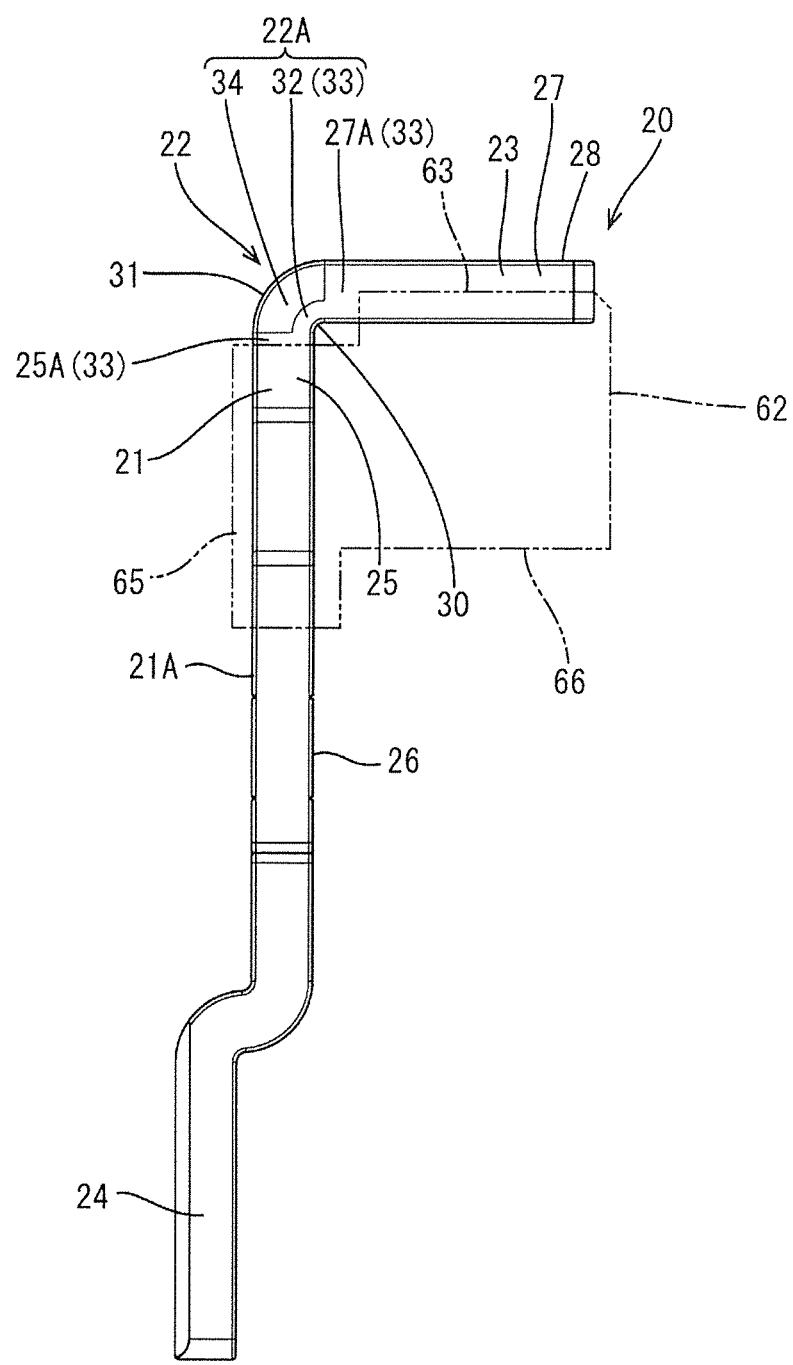
FIG. 17 is a side view of the terminal.

As shown in FIGS. 15 to 17, each terminal 20 is formed into a vertically long strip by applying press working to stamp and bend a thick metal plate material that is excellent in conductivity. Further, the terminal 20 includes a terminal body 21 in the form of a flat plate extending in the vertical direction, a bent portion (an example of a "press-worked portion") 22 provided on an upper end of the terminal body 21, a wire-side connecting portion 23 extending rearward from the bent portion 22, and a device-side connecting portion 24 in the form of a flat plate provided on a lower end part of the terminal body 21. Note that left and right terminals 20 have a common structure except that upper sides of the terminal bodies 21 are bent in opposite directions along the lateral direction. Thus, the terminal 20 on a shown right side in FIGS. 1 and 8 is described as a representative.

Figure 1:
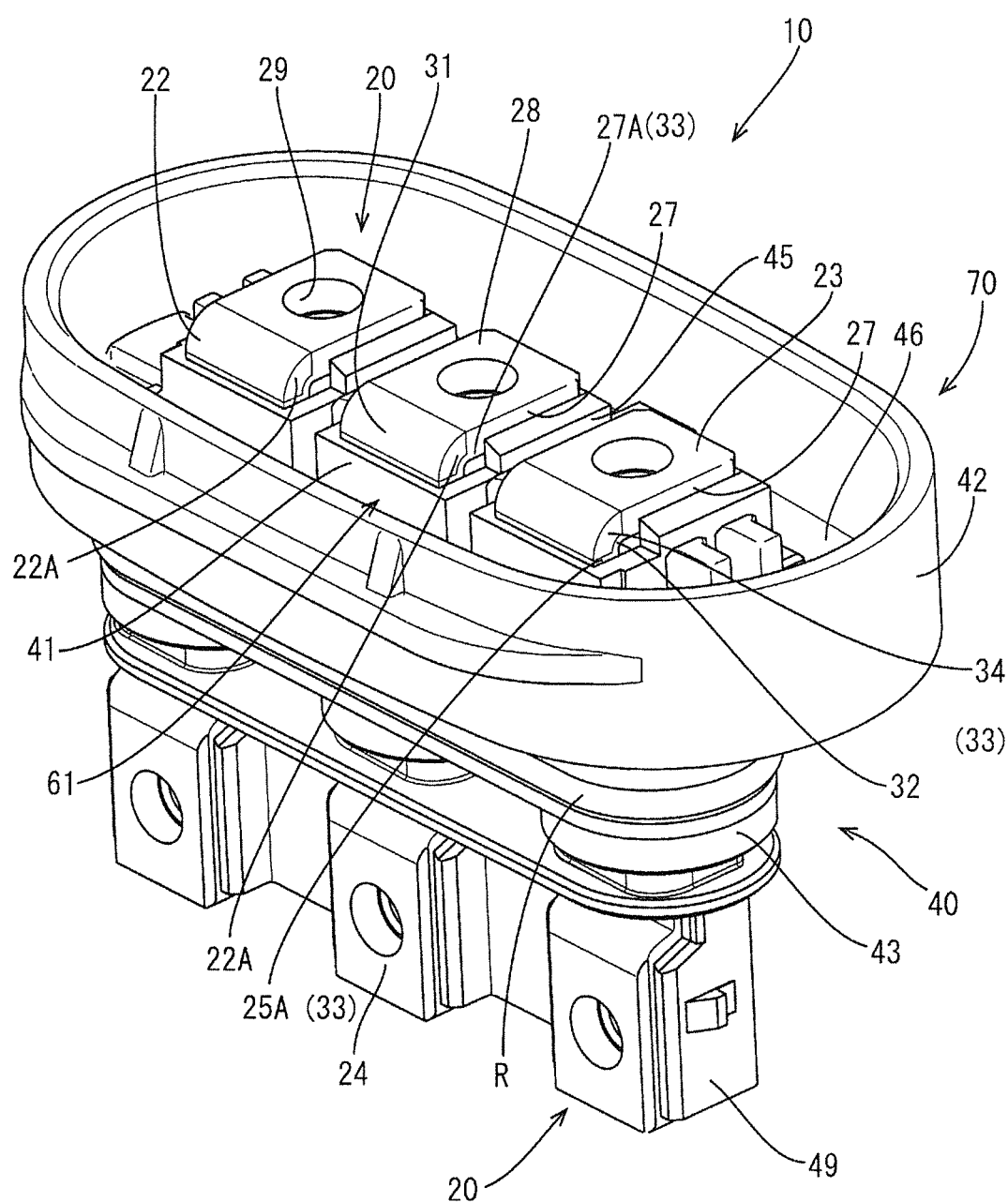
FIG. 1 is a perspective view of a terminal block.
Figure 2:
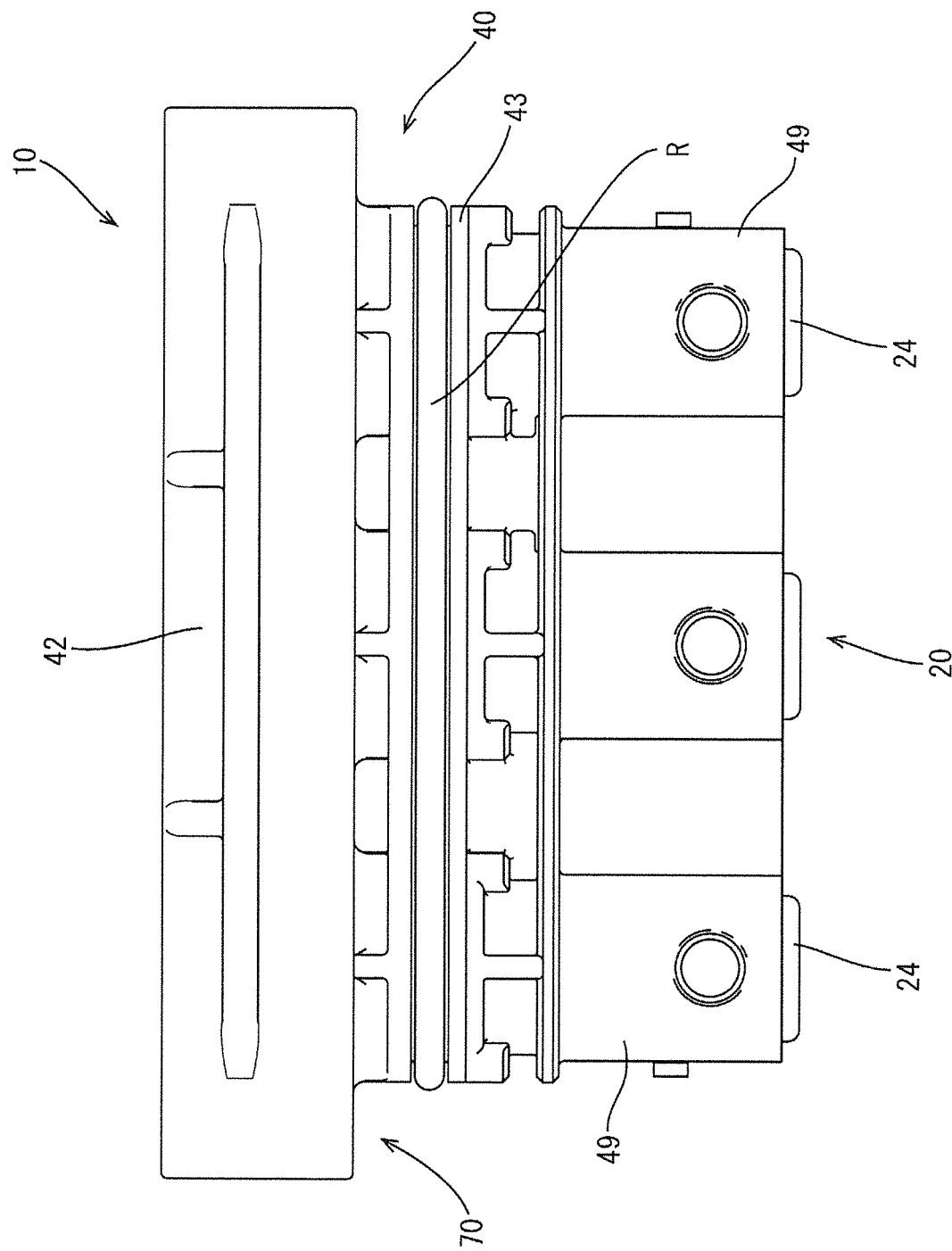
FIG. 2 is a back view of the terminal block.
Figure 5:
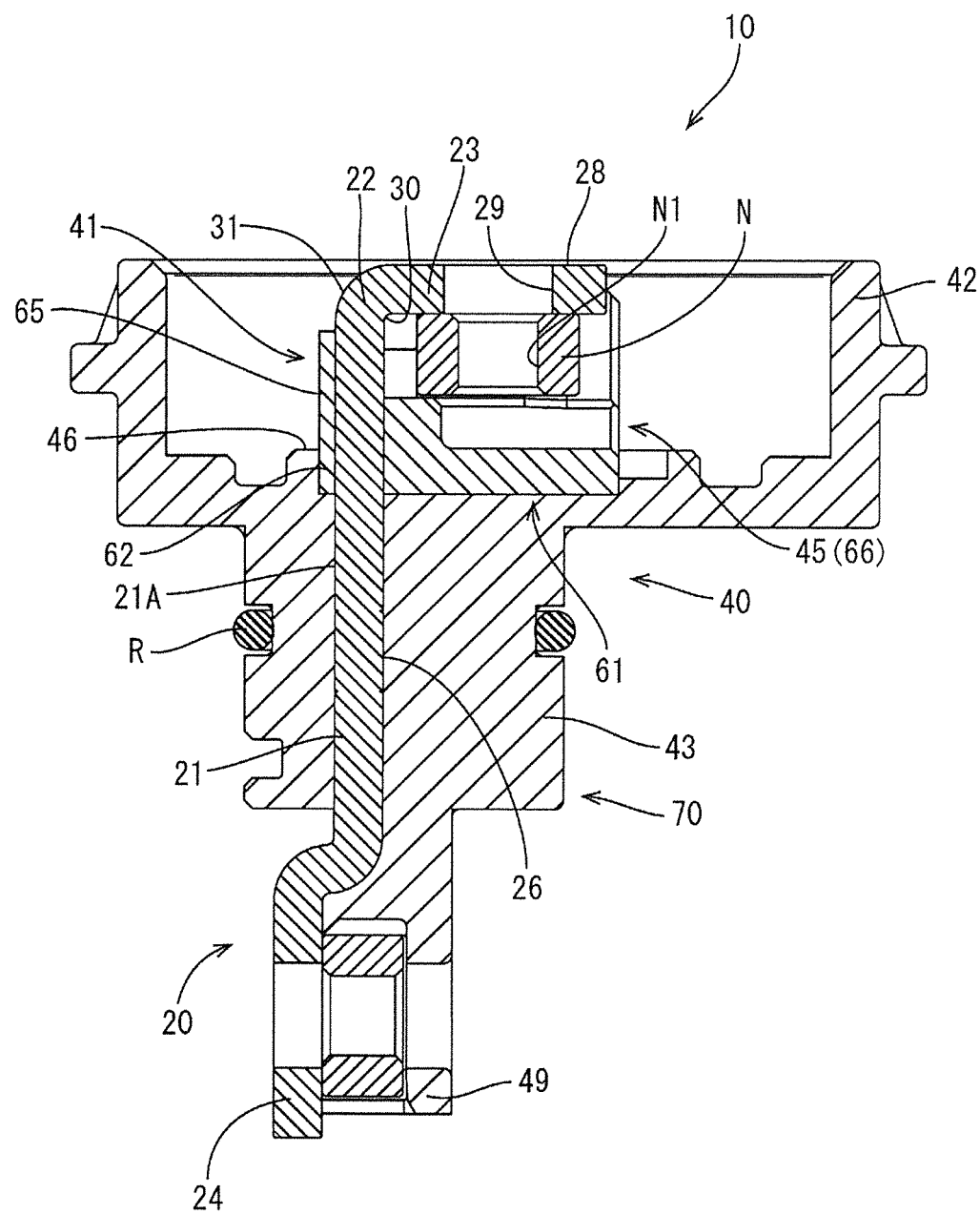
FIG. 5 is a section along A-A of FIG. 3.
Figure 6:
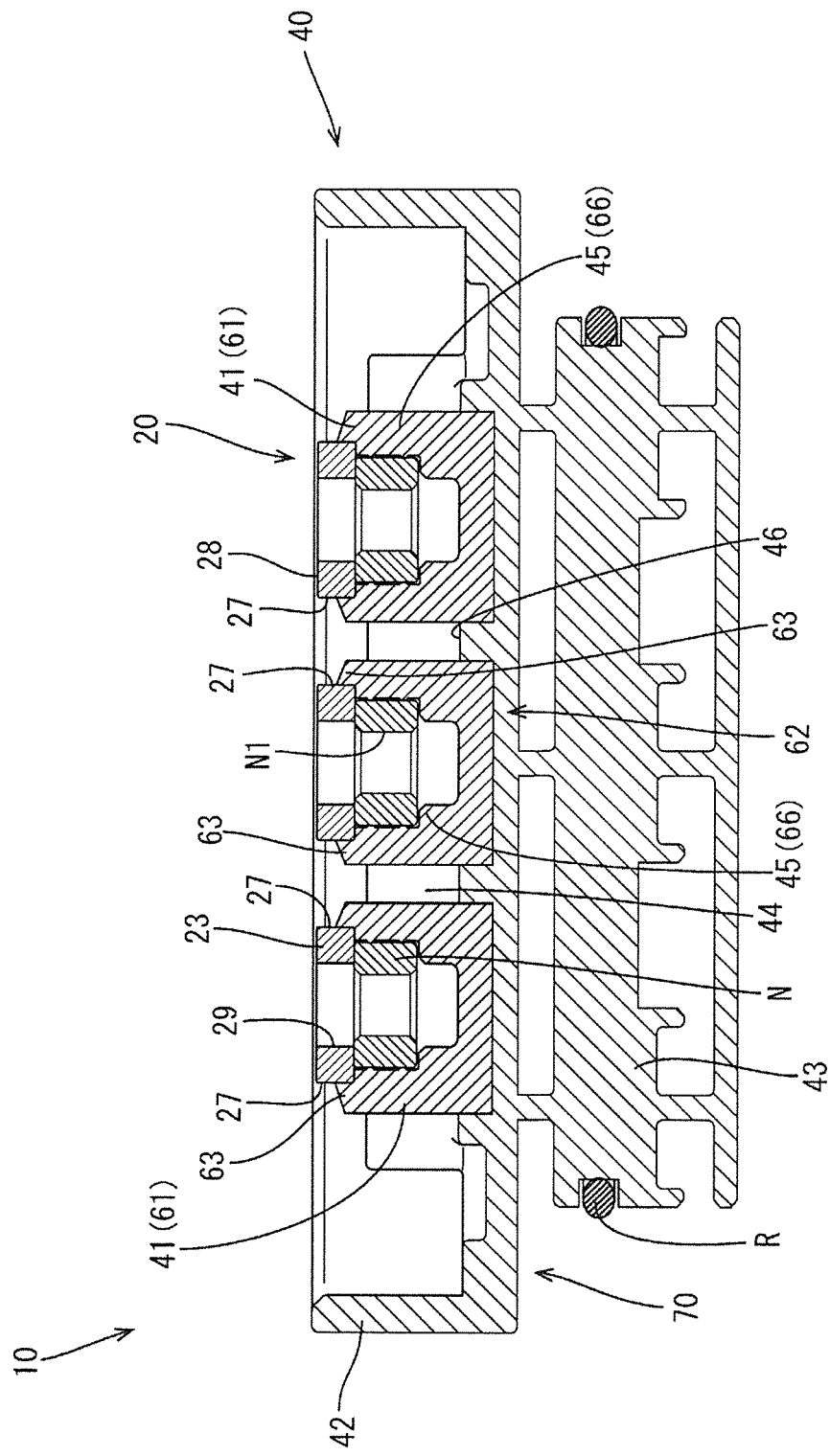
FIG. 6 is a section along B-B of FIG. 3.
Figure 7:
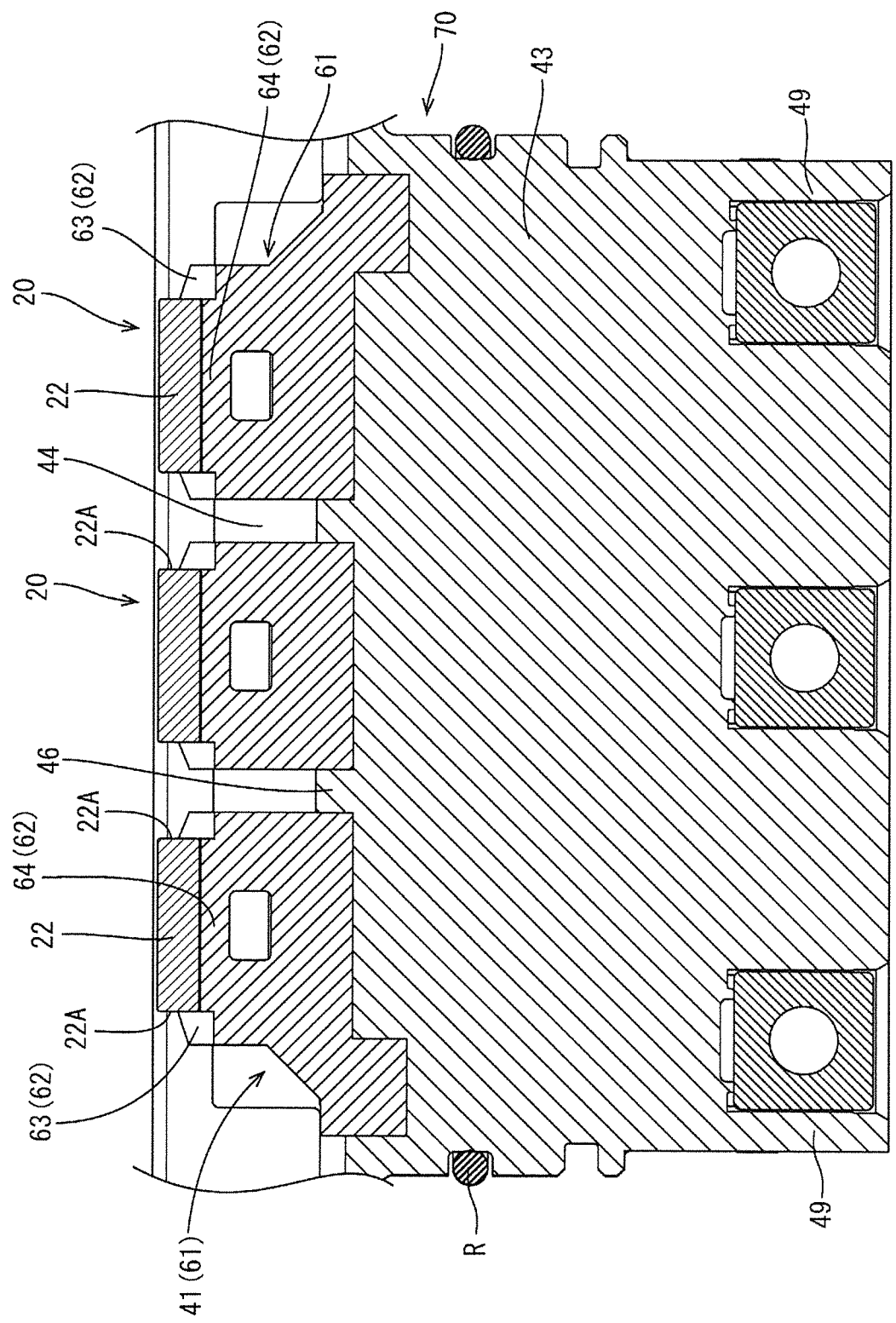
FIG. 7 is a section along C-C of FIG. 3.
Figure 10:
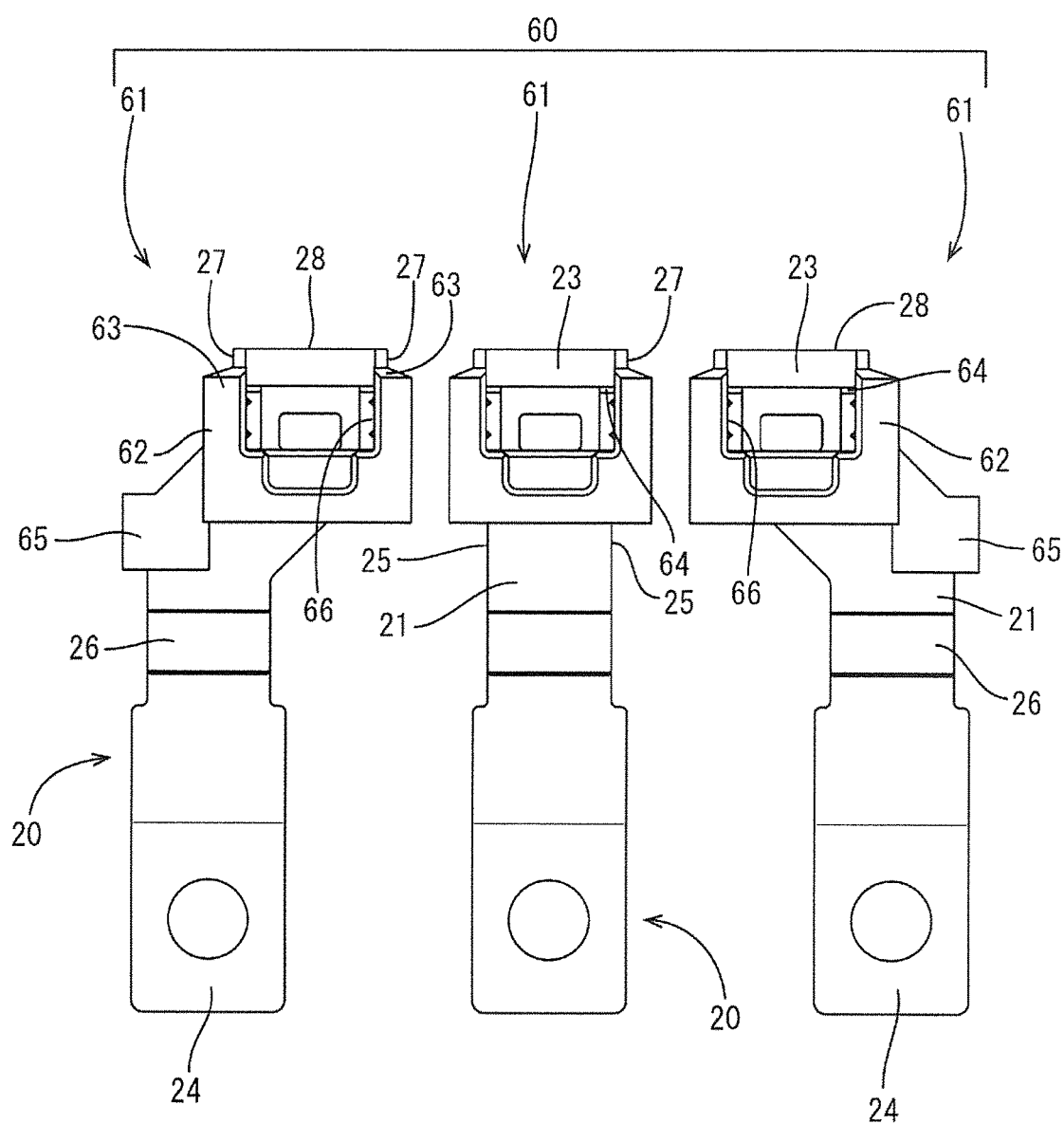
FIG. 10 is a back view of the primary molded product group.

As shown in FIGS. 1 and 5, the terminal body 21 is embedded entirely in the housing 40 except at upper and lower end parts thereof. Side surfaces on both lateral sides extending in the vertical direction in the upper end part of the terminal body 21 are flat body-side surfaces 25 extending straight in the vertical direction, as shown in FIGS. 15 and 17. As shown in FIGS. 8, 10 and 15, a sealant adhering portion 26 is provided in a substantially vertically central part of the terminal body 21, and an interface between the sealant adhering portion 26 and the housing 40 is waterproofed by adhering a sealant to the sealant adhering portion 26 and embedding the sealant adhering portion 26 in the housing 40.

Figure 11:
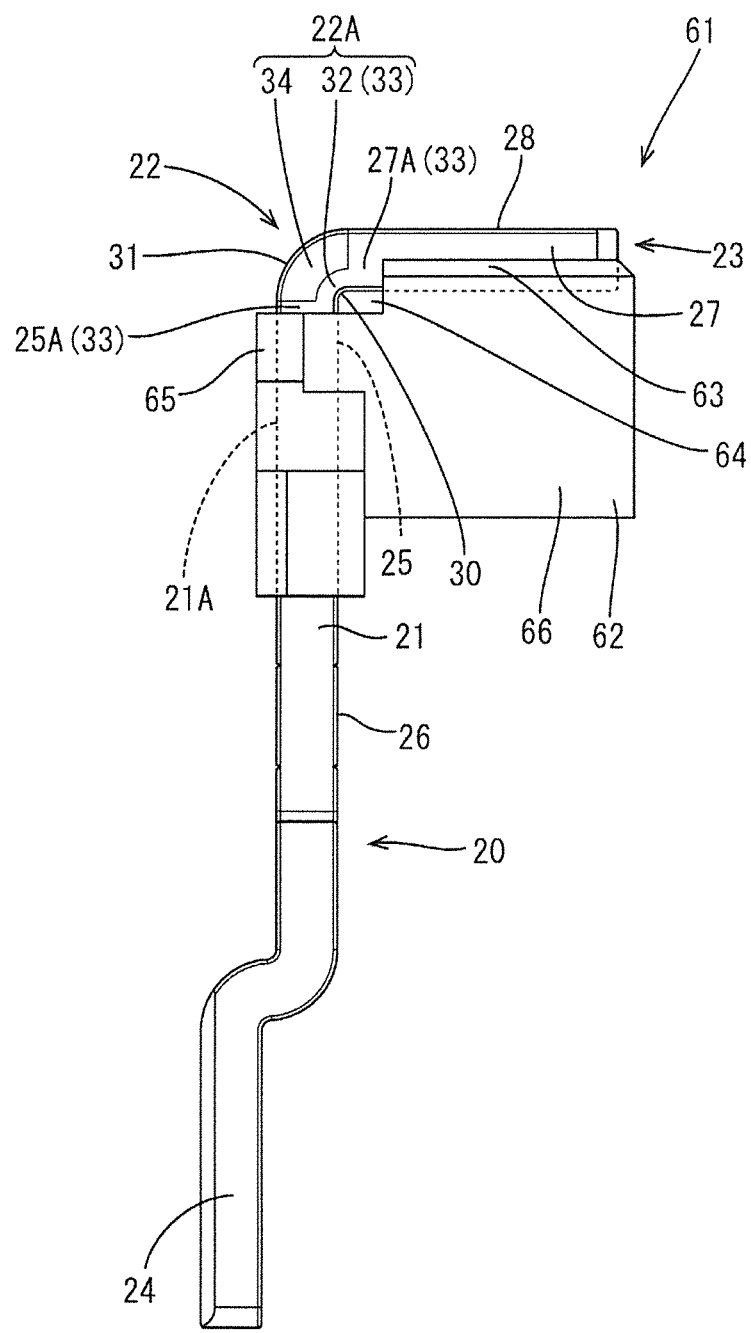
FIG. 11 is a side view of a primary molded product.

As shown in FIGS. 5, 11 and 15, the bend 22 is continuous with the upper end of the terminal body 21 and the front end of the wire-side connecting portion 23 and is bent substantially at a right angle to extend rearward from the upper end of the terminal body 21. Thus, side parts 22A of the bend 22 on both left and right sides extending in a bending direction are such that outer peripheral edges are curved more gently than inner peripheral edge parts as the bend 22 is bent, as shown in FIGS. 15 and 17.

As shown in FIGS. 15 to 17, the wire-side connecting portion 23 is a flat plate, and side surfaces on both lateral sides extending in an extending direction in the wire-side connecting portion 23 are flat connecting portion-side flat surfaces 27 extending in the front-rear direction. The upper surface of the wire-side connecting portion 23 serves as a connection surface 28 to be bolted to a mating terminal, and the wire-side connecting portion 23 is provided with a bolt hole 29 penetrating vertically in the plate thickness direction. The mating terminal is placed on the connection surface 28 of the wire-side connecting portion 23, and an unillustrated bolt is inserted into the bolt hole 29 to bolt the wire-side connecting portion 23 to the mating terminal.

The device-side connecting portion 24 is provided on the lower end part of the terminal body 21 while being somewhat offset forward from the terminal body 21 and can be bolted to the device-side terminal.

Figure 3:
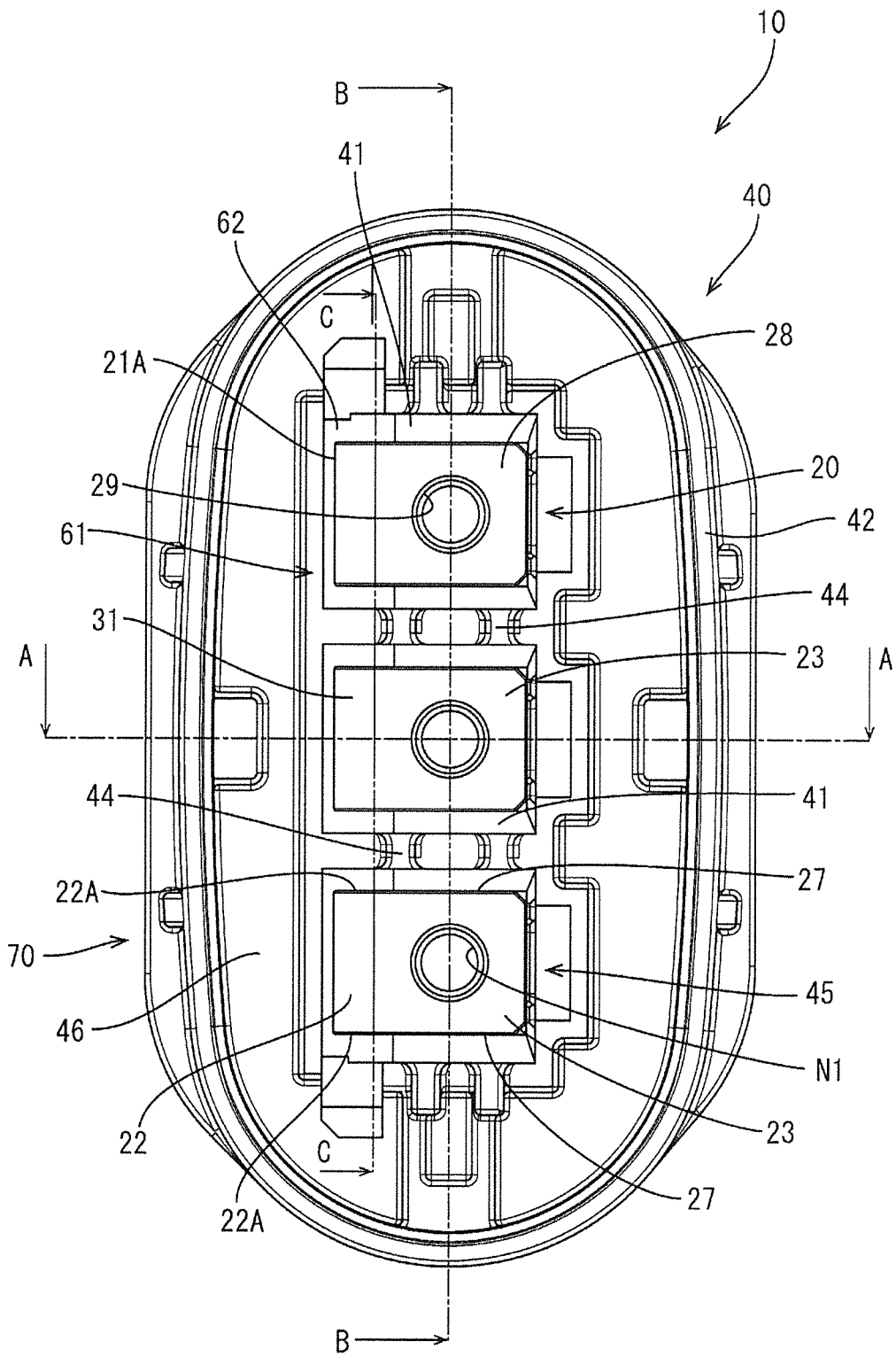
FIG. 3 is a plan view of the terminal block.
Figure 4:
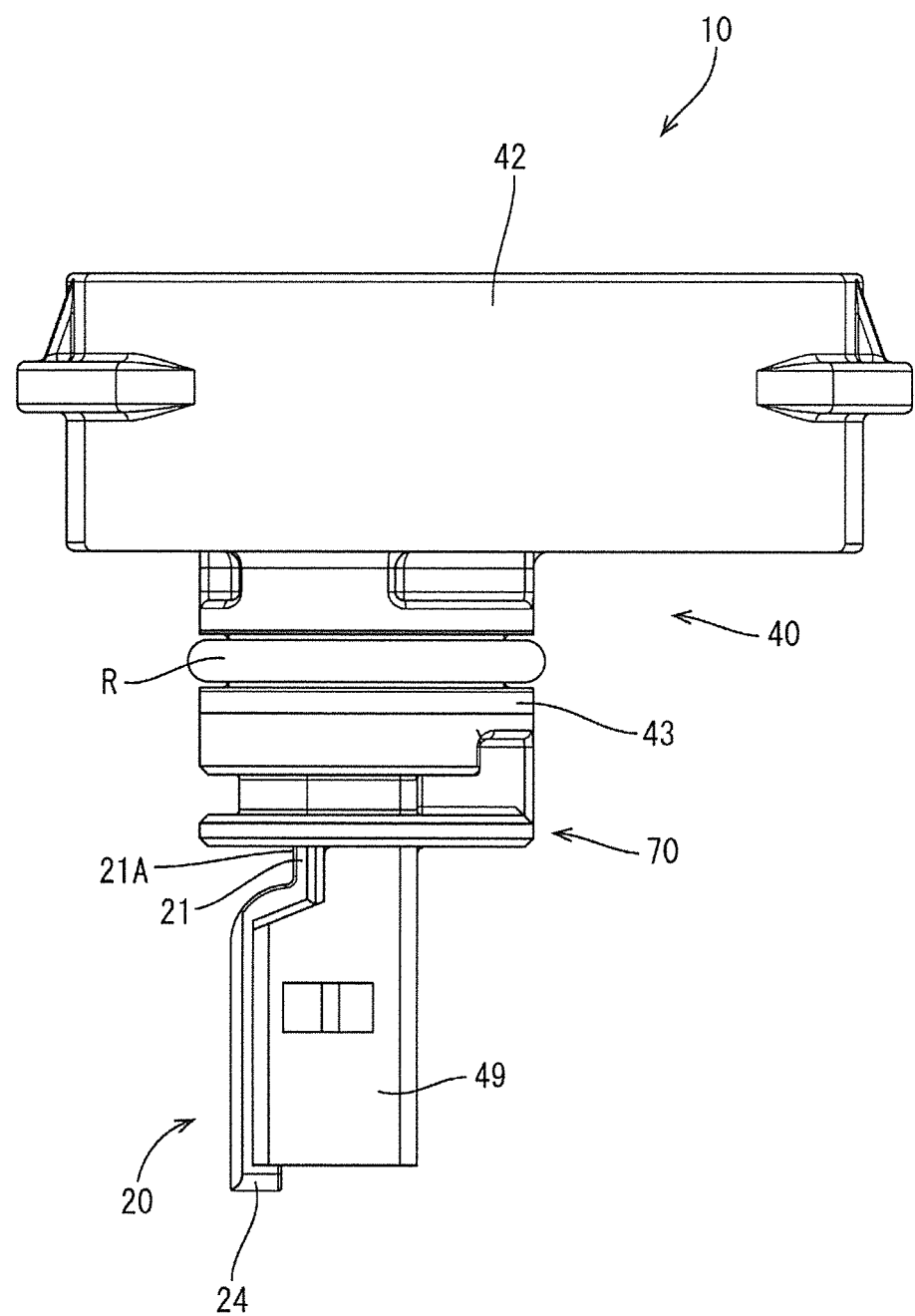
FIG. 4 is a side view of the terminal block.

As shown in FIGS. 1, 3 and 5, the housing 40 includes coverings 41 for covering the upper part of each terminal 20 from the front, rear, left and right sides, a tubular portion 42 for surrounding the upper end parts of the respective terminals 20 and the coverings 41 over the entire periphery and a fitting 43 to be fit into an unillustrated mounting hole provided in the case.

The covering portion 41 is formed into a block so that a lower half of the wire-side connecting portion 23 except rear end parts 27A of the connecting portion-side flat surfaces 27 and an inner curved surface 30 of the bend 22 are embedded, parts of the terminal body 21 near the upper end except upper end parts 25A of the body-side flat surfaces 25 in the terminal body 21 and an upper end part of the front surface of the terminal body 21 are embedded. Further, the respective coverings 41 are coupled by rib-like couplings 44 provided between adjacent coverings 41.

As shown in FIG. 5, a nut accommodating portion 45 for accommodating a nut N is provided inside each covering 41. The nut N is square and has a vertically open fastening hole N1. A thickness of the nut N is about twice the plate thickness of the terminal 20.

The nut accommodating portion 45 is open up and rearward, and the nut N is accommodated in a press-fit state through a rear end opening. An upper end opening of the nut accommodating portion 45 is closed by the wire-side connecting portion 23. When the nut N is accommodated at a proper position in the nut accommodating portion 45, the lower surface of the wire-side connecting portion 23 and the upper surface of the nut N are vertically in contact and the bolt hole 29 of the wire-side connecting portion 23 and the fastening hole N1 of the nut N are coaxial as shown in FIG. 5.

As shown in FIGS. 1 and 3, the tubular portion 42 is an upwardly open laterally long tube that has a bottom wall 46 in a lower end part. The bottom wall 46 and the wire-side connecting portions 23 of the terminals 20 face up through an upper end opening of the tubular portion 42. The bottom wall 46 has an elliptical shape long in the lateral direction, and three laterally juxtaposed coverings 41 are integral to the bottom wall 46 in a center of the bottom wall 46.

As shown in FIGS. 1, 2, 4 and 5, the fitting 43 extends down from the lower surface of the tubular portion 42, and a seal ring R is fit on the outer periphery of the fitting 43. Lower halves of the terminal bodies 21 of the three terminals 20 are embedded collectively inside the fitting 43, and the device-side connecting portions 24 of the terminals 20 project down from the lower surface of the fitting 43 below the fitting 43.

Laterally-coupled device-side nut accommodating portions 49 are provided for each terminal at positions continuous with a lower end part of the fitting 43 and behind the device-side connecting portions 24. The device-side nut accommodating portion 49 is open down, and a nut N is press-fit state into the device-side nut accommodating portion 49 through a lower end opening.

The terminal block 10 is formed by performing resin molding separately twice. Specifically, the terminal block 10 is formed as follows. First, primary molded products 61 each composed of the terminal 20 and a molded portion 62 are formed, and three primary molded products 61 are juxtaposed in the lateral direction to constitute a primary molded product group 60. Then, the primary molded product group 60 is set as a core in a mold, and a secondary molded portion 70 is formed by molding. Specifically, the housing 40 is formed by integrating the molded portions 62 of the primary molded products 61 and the secondary molded portion 70.

The primary molded products 61 and the secondary molded product 70 are described below.

The terminal 20 in the primary molded product 61 is formed by applying stamping and bending to the thick metal plate material by press working and including the bend 22 formed by being bent.

When the bend 22 is formed by applying bending to the thick metal plate material in the terminal 20, the outer peripheral edges of the sides 22A extending along a plate thickness direction of the bend 22 become thinned portions 34 thinned laterally inwardly as an outer curved surface 31 of the bend 22 extends. Further, excess metal parts bulging outward due to the deflection of the inner curved surface 30 of the bend 22 are formed on inner peripheral edges of the sides 22A of the bend 22. That is, the sides 22A of the bend 22 become wider from an outer side toward an inner side.

Figure 18:
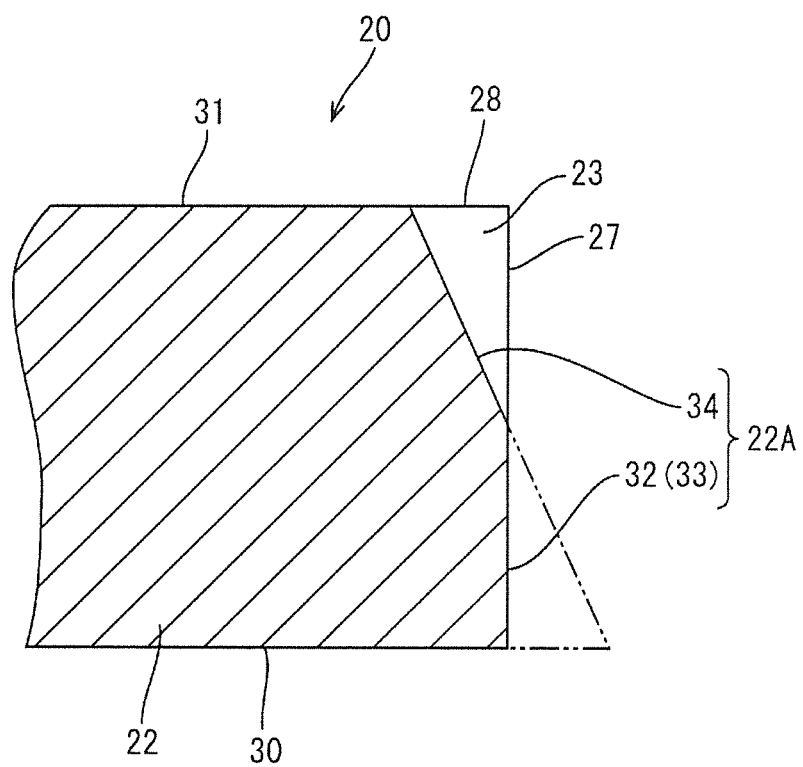
FIG. 18 is a sectional diagram of a bent portion.

Accordingly, by applying pressing or the like to flatten the excess metal parts formed on the sides 22A of the bend 22, flat surfaces 32 are formed on the inner peripheral edges of the sides 22A of the bend 22, as shown in FIG. 18. Further, the flat surface 32 is flush with the connecting portion-side flat surface 27 and the body-side flat surface 25, as shown in FIG. 15. That is, the side 22A of the bend 22 includes the flat surface 32 on the inner peripheral edge thereof and the thinned portion 34 thinner and narrower than the flat surface 32 on the outer peripheral edge thereof. Note that the other configuration of the terminal 20 is not described to avoid repeated description.

The molded portion 62 of the primary molded product 61 roughly constitutes the covering 41 in the housing 40, and is in the form of a rectangular block. Further, as shown in FIGS. 8, 11 and 12, the molded portion 62 includes a connecting portion covering 63 for embedding a lower end part of the wire-side connecting portion 23, a bend covering 64 for embedding the inner curved surface 30 of the bend 22, a body covering 65 for embedding a part of the terminal body 21 near the upper end and a nut accommodating portion 66 integrally formed to be continuous with these three coverings 63, 64 and 65.

As shown in FIGS. 10 to 13, the connecting portion covering 63 is formed to cover lower halves of the connecting portion-side flat surfaces 27 except rear end parts 27A of the connecting portion-side flat surfaces 27 from lateral sides and cover both lateral ends of the lower surface of the wire-side connecting portion 23 from below. Thus, the connecting portion covering 63 exposes the rear end parts 27A of the connecting portion-side flat surfaces 27.

As shown in FIGS. 8 and 11 to 14, the bend covering 64 is formed to be continuous with a rear end part of the connecting portion covering 63 while covering both lateral side edges of the inner curved surface 30 of the bend 22 obliquely from an lower-rear side, and exposes the both sides 22A of the bend 22.

Figure 12:
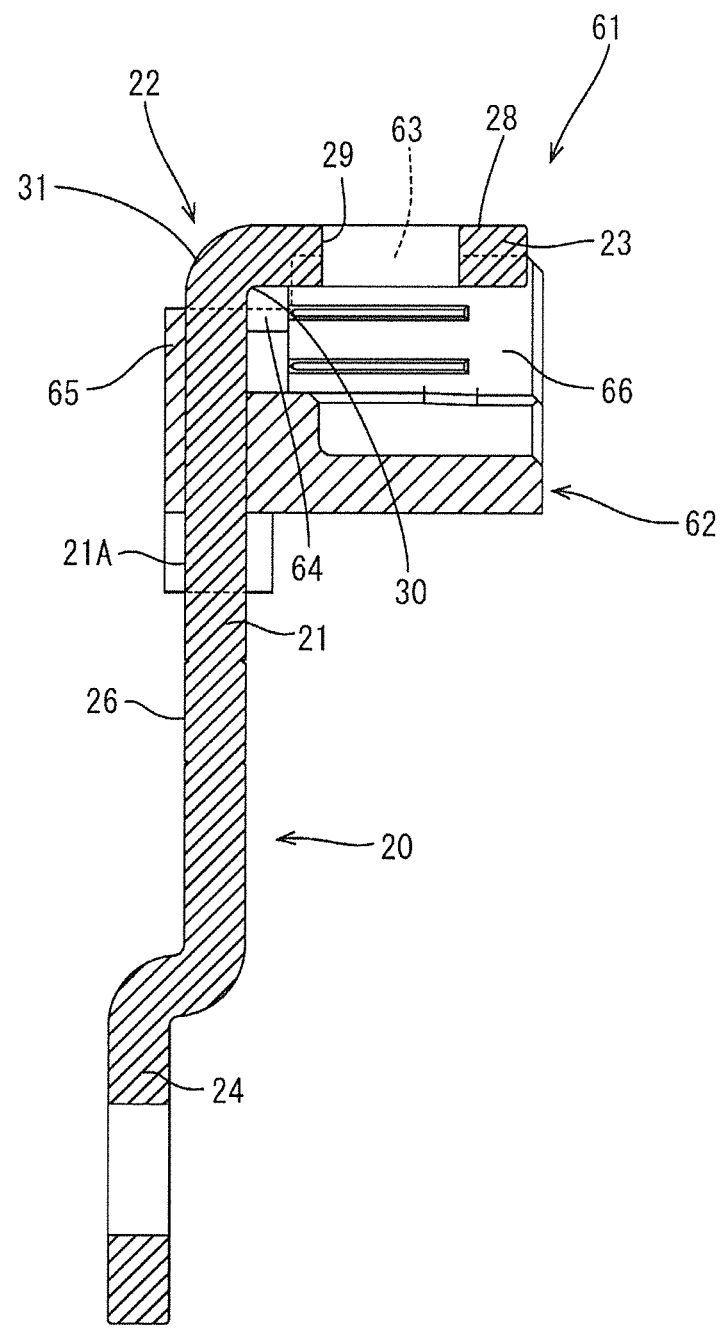
FIG. 12 is a section along D-D of FIG. 9.

As shown in FIGS. 10 to 12, the body covering 65 is formed to be continuous with a lower end part of the bend covering 64 while covering a part of the terminal body 21 near the upper end except an upper end part of a front surface 21A of the terminal body 21 and the upper end parts 25A of the body-side flat surfaces 25 over the entire periphery. Thus, the body covering 65 exposes the upper end parts 25A of the body-side flat surfaces 25.

Specifically, the both left and right sides 22A of the bend 22, the rear end parts 27A of the connecting portion-side flat surfaces 27 adjacent to the bend 22 and the connecting portion covering 63 and the upper end parts 25A of the body-side flat surfaces 25 adjacent to the bend 22 and the body covering 65 are all exposed from the molded portion 62 as shown in FIGS. 8, 11, 15 and 17, and the rear end part 27A of the connecting portion-side flat surface 27, the flat surface 32 of the bend 22 and the upper end part 25A of the body-side flat surface 25 of the terminal body 21 serve as a resin cut-off surface 33 continuous and flush with the side surface of the terminal 20.

Figure 13:
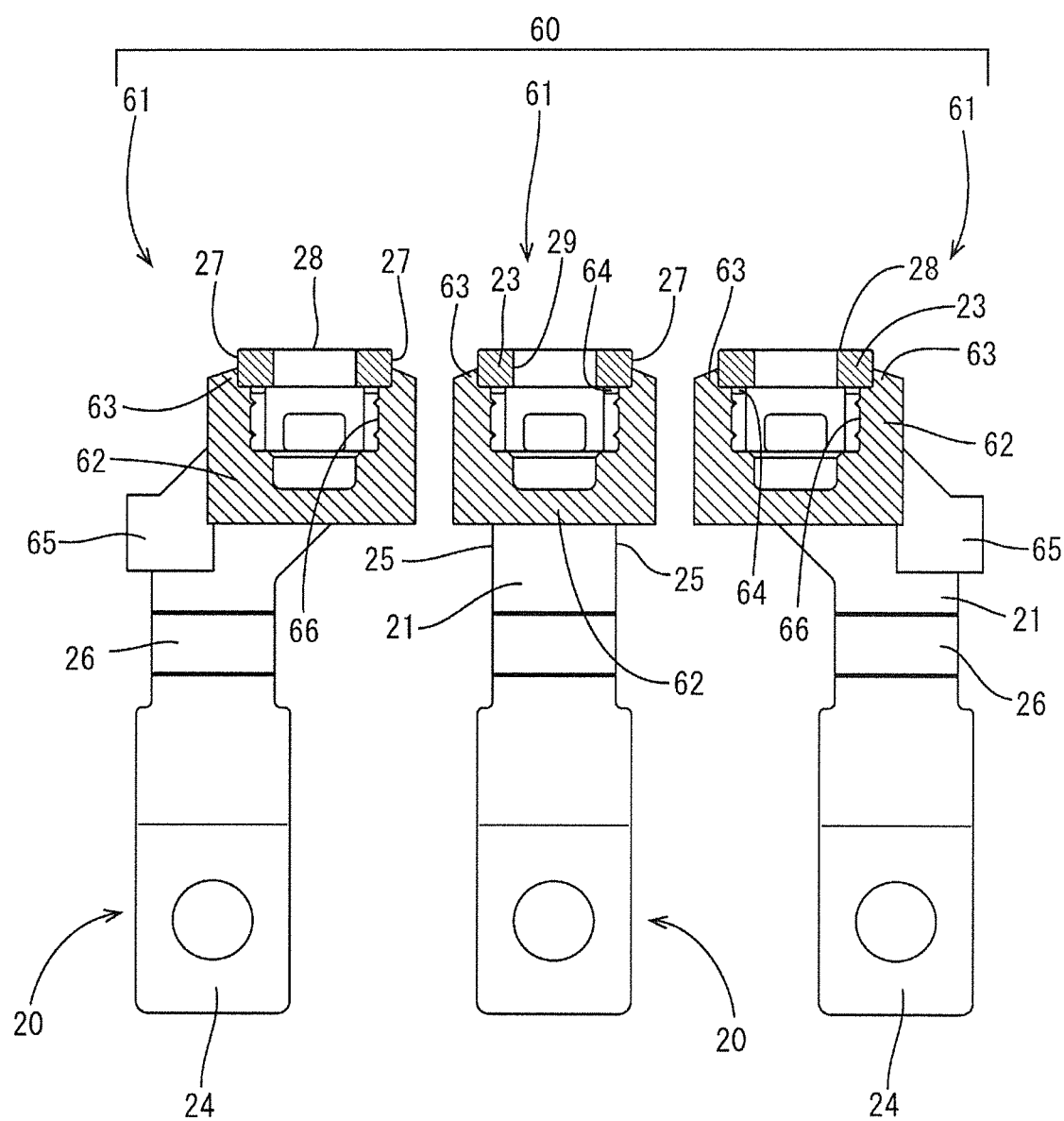
FIG. 13 is a section along E-E of FIG. 9.
Figure 14:
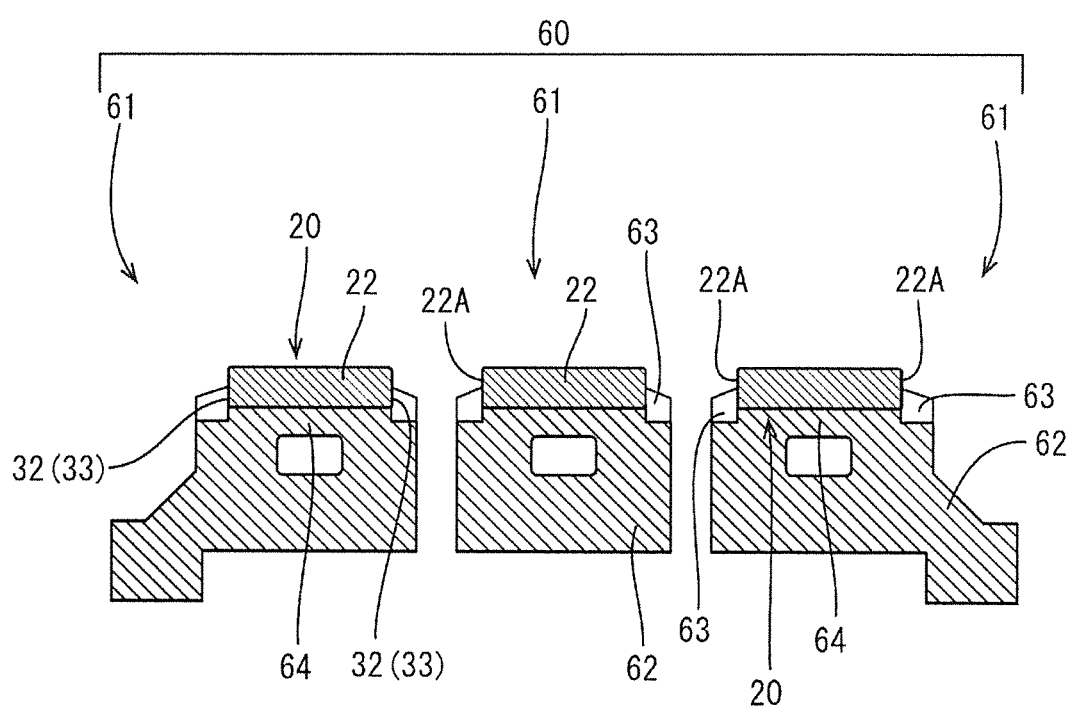
FIG. 14 is a section along F-F of FIG. 9.

The nut accommodating portion 66 constitutes the nut accommodating portion 45 of the housing 40 and is formed to be continuous with the lower end part of the connecting portion covering 63, the rear and lower end parts of the bend covering 64 and the rear end part of the body covering 65, as shown in FIGS. 12 and 13, and formed into a substantially rectangular box shape in a side view, as shown in FIG. 11. Note that the structure of the nut accommodating portion 66 is the same as that of the nut accommodating portion 45 described above and is not described to avoid repeated description. Further, the nuts N are inserted into the nut accommodating portions 66 after the primary molded products 61 are completed, and the secondary molded product 70 is formed using the primary molded products 61 with the nuts N accommodated therein as cores.

The secondary molded product 70 roughly constitutes the tubular portion 42, the fitting 43 and the device-side nut accommodating portions 49 in the housing 40. The bottom wall 46 of the tubular portion 42 is molded to be continuous with the lower end parts of the molded portions 62 of the primary molded products 61. Thus, the primary molded products 61 and the secondary molded product 70 are fixed integrally to constitute the terminal block 60.

This embodiment is configured as described above. Next, a procedure of assembling the terminal block 10 is briefly described and functions and effects of the terminal block 10 are described.

In assembling the terminal block 10, plural primary molded products 61 are formed first.

The primary molded product 61 is formed as follows. First, the terminal 20 is formed by applying stamping and bending to the thick metal plate material by press working and set in the mold (not shown).

When the terminal 20 is set in the mold, the terminal body 21 of the terminal 20 is pressed over the entire periphery by the mold at a position slightly above the sealant adhering portion 26, and the upper ends 25A of the body-side flat surfaces 25 and the upper end part of the front surface 21A of the terminal body 21 are pressed by the mold. Further, the rear end parts 27A of the connecting portion-side flat surfaces 27 and upper halves of the connecting portion-side flat surfaces 27 are pressed by the mold in the wire-side connecting portion 23 of the terminal 20 and the flat surfaces 32 of the sides 22A on both lateral sides are pressed in the bend 22. Specifically, the resin cut-off surfaces 33 are pressed by the mold on both side surfaces of the terminal 20.

If molding resin is injected into the mold in this state, the resin is cut off in parts where the terminal 20 and the mold are in contact. Thus, the molded portion 62 is formed and the primary molded product 61 in which the terminal 20 and the molded portion 62 are fixed integrally is completed.

For example, if a terminal including a bend is formed by press-working a thick metal plate material, but flat surface portions are not formed on side surfaces of the bend, excess metal parts formed according to press working remain on the side surfaces of the bent portion. Then, in setting the terminal in a mold, the excess metal parts interfere with the mold, and the terminal cannot be set in the mold.

Even if the terminal can be set in the mold, clearances may be formed between the side surfaces of the bend and the mold when the side surfaces of the bends are pressed by the mold. If the clearances are formed, resin leaks through the clearances and adheres to an outer curved surface of the bend and further a connection surface of a wire-side connecting portion.

According to this embodiment, when the terminal 20 is set in the mold, the resin cut-off surfaces 33 are pressed by the mold on the side surfaces of the terminal 20. Thus, the molding resin for forming respective coverings 63, 64 and 65 is reliably cut off at the resin cut-off surfaces 33 and the molded portion 62 is formed without the molding resin adhering to the thinned portions 34 disposed on sides opposite to the molded portion 62 across the flat surfaces 32 and the connection surface 28 of the wire-side connecting portion 23.

By cooling and curing the molded portion 62, the primary molded product 61 in which the terminal 20 and the molded portion 62 are fixed integrally is completed.

Specifically, according to this embodiment, the flat surfaces 32 are provided on the inner peripheral edges of the side parts 22A of the distorted bend 22 by press working and the molding resin can be cut off between the flat surfaces 32 and the mold, between the upper end parts 25A of the body-side flat surfaces 25 and the mold and between the rear end parts 27A of the connecting portion-side flat surfaces 27 and the mold, i.e. at the resin cut-off surfaces 33. Thus, it can be prevented that the molding resin adheres to the thinned portions 34 and the outer curved surface 31 of the bend 22 and further the connection surface 28 of the wire-side connecting portion 23 through the side parts 22A of the bend 22. In this way, a reduction of connection reliability between the wire-side connecting portion 23 and the mating terminal can be prevented.

After the primary molded products 61 are completed in this way, three primary molded products 61 are juxtaposed in the lateral direction to constitute the primary molded product group 60 and the secondary molded product 70 is formed using this primary molded product group 60 as a core to complete the terminal block 10.

In the case of cutting off the resin at the sides 22A of the bend 22, it is also, for example, considered to cut off the molding resin not only at the inner peripheral edges of the side surfaces of the bend, but also at the flat surfaces formed on the entire side surfaces of the bend or on the outer peripheral edge parts of the side surfaces of the bend.

However, if a thick metal plate material is bent, the outer peripheral edges on the side surfaces of the bend are thinned laterally inward as the outer curved surface of the bend extends, and excess metal parts bulging outward are formed on the inner peripheral edges of the side surfaces of the bend due to the deflection of the inner curved surface of the bend.

Accordingly, if it is tried to control a width of the bend on the entire side surfaces of the bend or on the outer peripheral edges of the side surfaces, the width of the bend of each terminal varies. In the case of setting such a terminal in a mold, the arrangement of the mold needs to be adjusted for each terminal and the mold needs to be brought into contact with the side surfaces of the bend. Thus, the work efficiency of a terminal block assembling operation is reduced.

However, according to this embodiment, the excess metal parts bulging on the sides 22A of the bend 22 are flattened to form the flat surfaces 32 flush with the connecting portion-side flat surfaces 27 of the wire-side connecting portion 23 and the body-side flat surfaces 25 of the terminal body 21. That is, since a lateral width of the bend 22 is aligned with those of the wire-side connecting portion 23 and the terminal body 21, the primary molded product 61 can be set in the mold without adjusting the arrangement of the mold for each terminal 20. In this way, a reduction of work efficiency in the assembling operation of the terminal block 10 can be prevented.

As described above, according to this embodiment, even if the bend 22 is bent substantially at a right angle and excess metal parts are formed on the inner peripheral edges of the sides 22A of the bend 22 in forming the primary molded product 61, the flat surfaces 32 are formed on the sides 22A of the distorted bend 22 by press working, the resin cut-off surfaces 33 are provided on the side surfaces of the terminal 20, and the molding resin can be cut off between the resin cut-off surfaces 33 and the mold. Thus, it can be prevented that the molding resin adheres to the outer curved surface 31 of the bend 22 and the connection surface 28 of the wire-side connecting portion 23 through the sides 22A of the bend 22. Specifically, it is possible to prevent a reduction of connection reliability between the wire-side connecting portion 23 and the mating terminal due to the adhesion of the resin to the connection surface 28 of the wire-side connecting portion 23.

Specifically, according to this embodiment, the primary molded product 61 can be set in the mold while preventing resin leakage in the primary molded product 61 only by applying flattening only to the inner peripheral edges on the side surfaces of the bend 22. This is very effective if a press-worked part is distorted due to an increase in the thickness of a metal plate material.

Further, according to this embodiment, the flat surfaces 32 are formed on the inner peripheral edges of the sides 22A of the bend 22 and the lateral width of the bend 22 is aligned with those of the wire-side connecting portion 23 and the terminal body 21. Thus, a dimensional control of the width of the entire terminal 20 can be facilitated as compared to the case where the width of the bend is set on the basis of the entire side surfaces of the bend or the outer peripheral edges of the side surfaces of the bend. In this way, the primary molded product 61 can be set in the mold without adjusting the arrangement of the mold for each terminal 20 and a reduction of work efficiency in the assembling operation of the terminal 10 can be reduced.

The invention is not limited to the above described and illustrated embodiment. For example, the following various modes also are included.

In the above embodiment, the terminal body 10 in which the flat surfaces 32 are formed on the bends 22 of the terminals 20 is shown as an example. However, without limitation to this, the technique disclosed in this specification may be applied in forming a resin molded product by insert molding with a bracket made of metal, a metal plate or the like placed as an insert in a resin portion made of synthetic resin.

In the above embodiment, the flat surfaces 32 are formed on the bend 22 bent substantially at a right angle. However, without limitation to this, flat surfaces may be formed on a bend bent at an obtuse or acute angle or flat surface portions may be formed on a part of a plate material bored by press working.

In the above embodiment, the flat surfaces 32 are formed by press-working the excess metal parts formed on the bend 22. However, without limitation to this, guides may be arranged on both side surfaces of a terminal and flat surface portions may be formed on both side surfaces of a bend by the guides in forming the bend.

LIST OF REFERENCE SIGNS

10: terminal block (resin molded product)
20: terminal (metal member)
21: terminal body (body portion)
22: bend (press-worked portion)
22A: side of bend
23: wire-side connecting portion (connecting portion)
30: inner curved surface
32: flat surface
34: thinned portion
40: housing (resin portion)
62: molded portion

The invention claimed is:

1. A resin molded product in which a plate-like metal member and a resin portion made of synthetic resin are integrally fixed, comprising:
   the plate-like metal member having a connection portion in the form of a flat plate and connectable to a mating conductor, a body, and a bend between the connecting portion and the body and bent such that an angle between the connecting portion and the body is a right angle;
   a molded portion configured to embed parts of side parts of the metal member extending along a plate thickness direction;
   flat surfaces provided on edges of the sides and disposed adjacent to the molded portion to be exposed from the molded portion; and
   thinned portions disposed on sides opposite to the molded portion across the flat surfaces on the sides and made thinner than the flat surfaces;
   wherein:
   the flat surfaces are provided on sides of the bend provided by bending the metal member;
   an inner curved surface of the bend is embedded in the molded portion;
   the flat surfaces are provided on inner peripheral edges of the bend extending along a bending direction; and
   the thinned portions are provided on outer peripheral edges of the bend extending along the bending direction.

2. A method for producing a resin molded product in which a plate-like metal member and a resin portion made of synthetic resin are integrally fixed, characterized in that:
   flat surfaces worked to be flat are formed on edge parts of a press-worked portion formed by press-working a metal member to provide a connection portion in the form of a flat plate and connectable to a mating conductor, a body, and a bend between the connecting portion and the body and bent such that an angle between the connecting portion and the body is a right angle; and
   a mold for forming the resin portion is brought into contact with the flat surfaces to cut off molding resin, thereby restricting the occurrence of resin leakage at side parts of the press-worked portion, while an inner curved surface of the bend is embedded in the molding resin.

* * * * *